United States Patent
Berglund et al.

(10) Patent No.: US 10,609,426 B2
(45) Date of Patent: Mar. 31, 2020

(54) METHOD AND SYSTEM FOR PLAYING BACK RECORDED VIDEO

(71) Applicant: AXIS AB, Lund (SE)

(72) Inventors: Björn Berglund, Lund (SE); Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 188 days.

(21) Appl. No.: 15/857,852

(22) Filed: Dec. 29, 2017

(65) Prior Publication Data

US 2018/0192091 A1 Jul. 5, 2018

(30) Foreign Application Priority Data

Dec. 29, 2016 (EP) .................................. 16207297

(51) Int. Cl.
| | | |
|---|---|---|
| *H04N 9/80* | (2006.01) | |
| *G11B 27/00* | (2006.01) | |
| *H04N 21/234* | (2011.01) | |
| *H04N 9/87* | (2006.01) | |
| *H04N 21/2743* | (2011.01) | |
| *H04N 21/43* | (2011.01) | |
| *H04N 21/2343* | (2011.01) | |
| *H04N 21/8547* | (2011.01) | |
| *H04N 19/87* | (2014.01) | |

(Continued)

(52) U.S. Cl.
CPC ..... *H04N 21/23418* (2013.01); *G11B 27/005* (2013.01); *G11B 27/10* (2013.01); *H04N 9/87* (2013.01); *H04N 19/87* (2014.11); *H04N 21/234381* (2013.01); *H04N 21/2743* (2013.01); *H04N 21/4307* (2013.01); *H04N 21/8547* (2013.01); *H04N 5/76* (2013.01)

(58) Field of Classification Search
USPC .................................................. 386/248, 278
See application file for complete search history.

(56) References Cited

U.S. PATENT DOCUMENTS 9,438,876 B2 9/2016 Li et al.
9,591,254 B2 * 3/2017 Bhuvanagiri .... G11B 20/00007
(Continued)

FOREIGN PATENT DOCUMENTS

EP 1 429 334 A2 6/2004
EP 1 429 334 A3 6/2004
(Continued)

OTHER PUBLICATIONS

EP 16207297.9 European Search Report (dated Jul. 4, 2017).

*Primary Examiner* — Nigar Chowdhury
(74) *Attorney, Agent, or Firm* — Volpe and Loenig, P.C.

(57) ABSTRACT

A method, video server, and system for playing back recorded video based on comparing the encoder frame rates at temporal positions of a received video sequence to a predetermined threshold and changing the playback frame rate to a playback frame rate greater than the encoder frame rate if the encoder frame rate is below the predetermined threshold and changing the playback frame rate to the encoder frame rate if the encoder frame rate is greater than the predetermined threshold. The recorded video is thereby played back in a time efficient manner, decreasing the total time period for video playback, and assisting a security operator in finding parts of the recorded video that may be of interest.

14 Claims, 4 Drawing Sheets

(51) Int. Cl.
*G11B 27/10* (2006.01)
*H04N 5/93* (2006.01)
*H04N 5/76* (2006.01)

(56) References Cited

U.S. PATENT DOCUMENTS

| | | | |
|---|---|---|---|
| 2006/0132622 A1* | 6/2006 | Ikeyama | H04N 5/772 |
| | | | 348/231.99 |
| 2009/0220206 A1* | 9/2009 | Kisliakov | G11B 27/034 |
| | | | 386/353 |
| 2010/0265344 A1* | 10/2010 | Velarde | H04N 5/232 |
| | | | 348/208.16 |
| 2011/0064129 A1 | 3/2011 | Bennett et al. | |
| 2011/0164860 A1* | 7/2011 | Nakagawa | H04N 5/772 |
| | | | 386/343 |
| 2011/0271092 A1* | 11/2011 | Brelay | G11B 27/005 |
| | | | 713/150 |
| 2012/0011552 A1* | 1/2012 | Yao | H04N 21/23418 |
| | | | 725/88 |
| 2012/0114304 A1* | 5/2012 | Mikawa | H04N 5/783 |
| | | | 386/248 |
| 2013/0019273 A1* | 1/2013 | Ma | H04N 21/234309 |
| | | | 725/90 |
| 2013/0191861 A1* | 7/2013 | Sasaki | H04N 21/236 |
| | | | 725/32 |
| 2014/0270719 A1* | 9/2014 | Nakano | H04N 7/181 |
| | | | 386/328 |
| 2014/0362908 A1* | 12/2014 | Lundberg | H04N 19/503 |
| | | | 375/240.12 |
| 2015/0098691 A1 | 4/2015 | Avrahami et al. | |
| 2015/0120876 A1* | 4/2015 | Parthasarathy | H04N 21/2401 |
| | | | 709/219 |
| 2016/0191960 A1* | 6/2016 | Hoeben | H04N 21/234 |
| | | | 725/41 |
| 2016/0313903 A1* | 10/2016 | Rabinovitz | G06F 3/0485 |
| 2016/0344927 A1* | 11/2016 | Brasket | H04N 5/23219 |

FOREIGN PATENT DOCUMENTS

| | | |
|---|---|---|
| JP | 2010-074323 A | 4/2010 |
| WO | 2003/053063 A1 | 6/2003 |

* cited by examiner

METHOD AND SYSTEM FOR PLAYING BACK RECORDED VIDEO

FIELD OF INVENTION

The present teachings relate to the field of video monitoring. In particular, the present teachings relate to a method and system for playing back recorded video.

BACKGROUND

Video management systems are generally arranged to handle recordings from a system of monitoring cameras monitoring, for example, a premises, an office complex, a shopping mall, a public transport system, and the like. The video management systems are often managed by a team of security operators who uses the captured video footage for live surveillance as well as for forensic search of video sequences connected to an incident of interest. Incidents of interest to search for in the recorded video sequences may be of various nature, for example, a bus crashing into a parked car, a robbery at a bank, a fight between two persons, someone leaving a suitcase at a platform and the like.

It is a tedious and time consuming task for a security operator to manually go through video recordings searching for a particular incident of interest as there are typically large amounts of video footage to go through. Even if the time period of the incident is at least roughly known, an hour of recorded video footage will still take an hour to go through in real-time playback pace and there are typically video footage from more than one camera to go through when searching for recorded video sequences of interest from a system of monitoring cameras.

A lot of the recorded video footage is typically from static scenes where nothing happens, (e.g., night time surveillance of a super-market where nothing normally happens most of the time but then there might be a burglar that passes by one of the cameras for a very short period of time). There is the possibility of fast forwarding the playback and hence increase the playback pace, but in that case passages of interest might also easily be missed due to higher playback speed, and especially details of interest such as, for example, a shadow moving in the periphery of the camera view.

There is also the possibility to use video analytics to identify incidents of interest from video footage. However, it will typically be a complex and time consuming problem to configure and apply a video analysis rule to aid in the forensic search for a specific incident as there are many different types of incidents that are difficult to generalize and define in a common way, in a lot of incidents of interest it may also be difficult to exactly define what is the distinguishing attributes to look for before the actual incident is found in the video footage. Further improvements to video playback methods are hence needed.

SUMMARY

In view of the above, it is thus an object of the disclosure to provide an improved method, video server, and system for playing back recorded video. In particular, it is an object to provide a method, a video server, and a system for playing back recorded video in a time efficient manner, decreasing the total time period for video playback, and functioning as an aid in finding parts of the recorded video that may be of interest.

It is another object of the disclosure to provide a method, a video server, and a system for playing back and synchronizing the playback of two video streams, captured during at least one overlapping time period, which is decreasing the total time period for video playback, and functioning as an aid in finding parts of the recorded video that may be of interest.

According to a first aspect, the above object is achieved by a method for playing back recorded video, the method comprising: receiving a video stream comprising a sequence of video frames with associated time stamps, determining encoder frame rate parameters for various temporal positions in the received video stream from time stamps of the received video frames or from encoder frame rate values embedded in the received video stream, changing, at temporal positions in the received video stream when the determined encoder frame rate parameter is smaller than a predetermined threshold, a playback frame rate to a frame rate being greater than the determined encoder frame rate parameter, changing, at temporal positions in the received video stream when the determined encoder frame rate parameter is greater than the predetermined threshold, a playback frame rate to a playback frame rate being equal to the determined encoder frame rate parameter, and playing back video frames of the received video stream in the changed playback frame rate.

In this manner, the encoder frame rate will be used to find video sequences which have been regarded to be of interest when the video sequences were encoded. For example, this is possible when the encoder implements variable frame rate and such encoding generally generates a video sequence having low frame rate if nothing changes in the scene, which often correlates to nothing interesting being recorded. Further, such variable frame rate encoding consequently generates high frame rate if a lot is changing in the scene, which often correlates to interesting events being recorded. The playback frame rate will be changed for parts of the video sequence where the encoder frame rate is smaller than a predetermined threshold, effectively achieving fast forwarding of parts of the video sequence which has been regarded as not comprising that many moving objects in the monitored scene, that much action in the monitored scene, and the like. The playback frame rate will be changed to the encoder frame rate for parts of the video sequence where the encoder frame rate is greater than a predetermined threshold, allowing for a playback frame rate in the same frame rate as the encoder frame rate for parts of the video sequence which has been regarded as comprising moving objects in the monitored scene, action in the monitored scene etc.

The present teachings will hence aid the person viewing the playback of the video sequence in spending relatively more time on viewing part of the video sequence that is regarded by the encoding algorithm to be of interest. As parts of the video sequence not comprising action or depicting very little movements and the like will be fast forwarded, less playback time will be spent on these parts of the video sequence and thereby aiding the person viewing the playback to spend time on parts of the video sequence that might be of interest. A person looking for video footage depicting an incident of interest will hence spend less time on the playback of video sequences. Another advantage of the method is that no advanced video analytics algorithms are needed to select sequences of interest, as this is determined by comparing the encoder frame rate to a predetermined threshold, which in comparison requires less processing power and very little configuration compared to what is required for video analytics algorithms.

According to a second embodiment, the received video stream is a received first video stream and the method is further comprising the steps of; receiving a second video stream comprising a second sequence of video frames with associated time stamps, wherein the first and second received video stream have been captured during at least one overlapping time period, determining encoder frame rate parameters for various temporal positions in the received second video stream from time stamps of the received video frames of the second video stream or from encoder frame rate values embedded in the received second video stream, wherein the playback frame rate is changed, at temporal positions in the first received video stream when the determined encoder frame rate parameter of the first video stream and the determined frame rate parameter of the second video stream are both smaller than the predetermined threshold, to a frame rate being greater than the determined frame rate parameter of the received first video stream, wherein the playback frame rate of is changed, at temporal positions when the determined encoder frame rate parameter of the received first video stream or received second video stream is greater than the predetermined threshold, to a frame rate being equal to the determined frame rate parameter of the received first video stream.

In this manner, the playback frame rate of a first video sequence will be dependent on the encoder frame rates of the received first and the second video sequence. This will imply that fast forwarding only is performed if the encoder frame rates of both of the video sequences are below a predetermined threshold. This will be an aid to a person searching for video footage depicting an incident of interest in a video archive comprising video sequences from a monitoring system of a plurality of monitoring cameras. In such systems the video sequences of different cameras may be connected, (e.g., depicting the same scene from different viewing angles). In such cases it may be of interest to playback parts of the video sequence in the encoder frame rate if there is concurrent activity or motion in another video sequence which in some respect is connected to the first video sequence. This may aid a security operator searching for video footage of an incident of interest to notice details of interest in the first video sequence that is concurrent with the activity in the second video sequence, but at the same time offer playback in a time efficient manner as the playback frame rate is changed to a fast forward frame rate during time periods when the encoder frame rates of both the first and the second video sequence are smaller than the predetermined threshold.

According to a third embodiment, the playback frame rate of the received second video stream is also changed, at temporal positions in the second received video stream when the determined frame rate parameter of the first video stream and the determined frame rate parameter of the second video stream are both smaller than the predetermined threshold, to a frame rate being greater than the determined frame rate parameter of the received second video stream, wherein the playback frame rate of the received second video stream is changed, at temporal positions when the determined encoder frame rate parameter of the received first video stream or received second video stream is greater than the predetermined threshold, to a frame rate being equal to the determined frame rate parameter of the received second video stream, further comprising the step of playing back video frames of the received second video stream in the changed playback frame rate of the received second video stream.

The playback frame rate of the second video stream will also be changed and synchronized with the fast forwarding of the first video stream. This offers the advantage of playing back the two streams concurrently and synchronized, to help a person searching for video footage of an incident of interest to spot concurrent events recorded in the two video streams.

In a further embodiment, the playback frame rate is further changed to a frame rate being lesser than the determined encoder frame rate parameter at temporal positions in the received video stream when the determined encoder frame rate parameter is greater than a predetermined threshold for slow-motion playback.

This will offer the possibility of slow motion playback of parts of the video sequence that has high encoder frame rate and hence also has been regarded to depict rapid movements and high levels of activity. As rapid movements may be difficult to grasp in the encoder frame rate the slow motion playback will aid in giving the person searching for incidents of interest relatively more time to scrutinize these parts of the video sequence.

In further embodiments, different methods for determining the encoder frame rate are specified. The step of determining encoder frame rate parameters for various temporal positions in the received video stream from time stamps of the received video frames comprises for a temporal position counting the number of consecutive received video frames in a video stream within a predetermined time period including the temporal position in the received video stream and dividing the counted number of consecutive frames with the predetermined time period to determine the encoder frame rate parameters.

Alternatively, the step of determining encoder frame rate parameters for various temporal positions in the received video stream from time stamps of the received video frames comprises for a temporal position calculating the difference in time between a time stamp of video frame at the temporal position and the time stamp of the preceding, or succeeding, video frame and determining the receive frame parameter for the temporal position from the calculated difference in time.

Counting video frames over a predetermined time period or calculating the time difference between consecutive video frames both offers ways of determining the encoder frame rate in a manner that is not requiring a lot of processing power, it also uses the time stamps of the video frames which are normally accompanied with the video frames in standard procedure, hence not requiring any special settings or requests to be made in order to perform the method according to the disclosed teachings.

In yet another embodiment, the step of determining encoder frame rate parameters for various temporal positions in the received video stream from encoder frame rate values embedded in the received video stream comprises extracting the encoder frame rate values embedded in the received video from the headers of the received video stream.

This has the further advantage of not needing to calculate the encoder frame rates from time stamps of the video frames.

In yet a further embodiment, the step of determining encoder frame rate parameters for various temporal positions in the received video stream further comprises; analysing the video encoding blocks of the received video frames to identify empty video frames as video frames solely comprising video encoding blocks of skip block type, and, disregarding the identified empty video frames as video frames when determining encoder frame rate parameters.

This embodiment offers the advantage of making the disclosed teachings compliant with a plurality of video encoding modes of the video encoder encoding the received video stream(s). Independently of if the video encoder decreases the encoder frame rate by encoding some frames as empty frames, solely comprising encoding units of skip block type, or by not transmitting all frames, the correct encoder frame rate will be determined.

In a further embodiment, it is further specified that the received video stream is encoded with a variable encoder frame rate such that the received video stream is encoded with a first encoder frame rate during a first part of the received video stream and another encoder frame rate during another part of the received video stream.

According to a second aspect, a computer program product comprising a computer-readable storage medium with instructions adapted to carry out the method described in connection to the first aspect of the present teachings when executed by a processor. The advantages mentioned in relation to the first aspect of the present teachings are also applicable for this second aspect.

According to a third aspect, the present teachings relate to a video server for playing back recorded video, comprising; a receiving device arranged to receive at least one video stream comprising a sequence of video frames with associated time stamps, a frame rate determining device arranged to determine encoder frame rate parameters for various temporal positions in the at least one received video stream from time stamps of the received video frames or from encoder frame rate values embedded in the received video stream, a playback frame rate changing device, arranged to change, at temporal positions in the received video stream when the determined encoder frame rate parameter of the received video stream is smaller than a predetermined threshold, a playback frame rate of a received video stream to a frame rate being greater than the determined encoder frame rate parameter, and to change, at temporal positions in the received video stream when the determined frame rate parameter of the received video steam is greater than the predetermined threshold, a playback frame rate being equal to the determined encoder frame rate parameter of the received video stream, a video signal generating device arranged to generate video signals representing the received video stream in the changed playback frame rate.

According to further embodiments of the third aspect, the receiving device of the video server is arranged to receive a first and a second video stream comprising sequences of video frames with associated time stamps, wherein the first and second received video stream have been captured during at least one overlapping time period, the playback frame rate changing device is arranged to change, at temporal positions when the determined frame rate parameter of the first video stream and the determined frame rate parameter of the second video stream are both smaller than the predetermined threshold, the playback frame rate of the received first video stream to a frame rate being greater than the determined frame rate parameter of the received first video stream, and to change, at temporal positions when the determined frame rate parameter of the received first video stream or the determined frame rate parameter of the received second video stream is greater than the predetermined threshold, to a frame rate being equal to the determined frame rate parameter of the received first video stream, the video signal generating device is further arranged to generate video signals representing the second received video stream in the changed playback frame rate. The advantages mentioned in relation to the first aspect of the present teachings are also applicable for this third aspect of the present teachings.

According to a fourth aspect, the present teachings relate to a video system for playing back recorded video, comprising an image capturing device, arranged to capture image data of a scene, encoding the captured image data as video frames of a video stream and transmitting the video stream, the video server according to the third aspect of the present teachings, arranged to receive the transmitted video stream from the monitoring camera, and, a display device arranged to receive and display the video signals generated by the video server.

According to further embodiments of the fourth aspect, the image capturing device of the system according to the previous embodiment is a first image capturing device, arranged to capture image data of a scene, encoding the captured image data as video frames of a first video stream and transmitting the first video stream, the system is further comprising; a second image capturing device arranged to capture image data of a scene, encoding the captured image data as video frames of a second video stream and transmitting the second video stream, wherein the first and second video streams are captured during at least one overlapping time period, the video server of the further embodiment of the third aspect of the present teachings, and, a display device arranged to receive and display the video signals generated by the video server representing the received first video stream and received second video stream, wherein the received first video stream and received second video stream are displayed concurrently during the at least one overlapping time period by the display device. The advantages mentioned in relation to the first aspect of the present teachings are also applicable for this fourth aspect of the present teachings.

A further scope of applicability of the present teachings will become apparent from the detailed description given below. However, it should be understood that the detailed description and specific examples, while indicating preferred embodiments, are given by way of illustration only, since various changes and modifications within the scope of the present teachings will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an," "the", and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
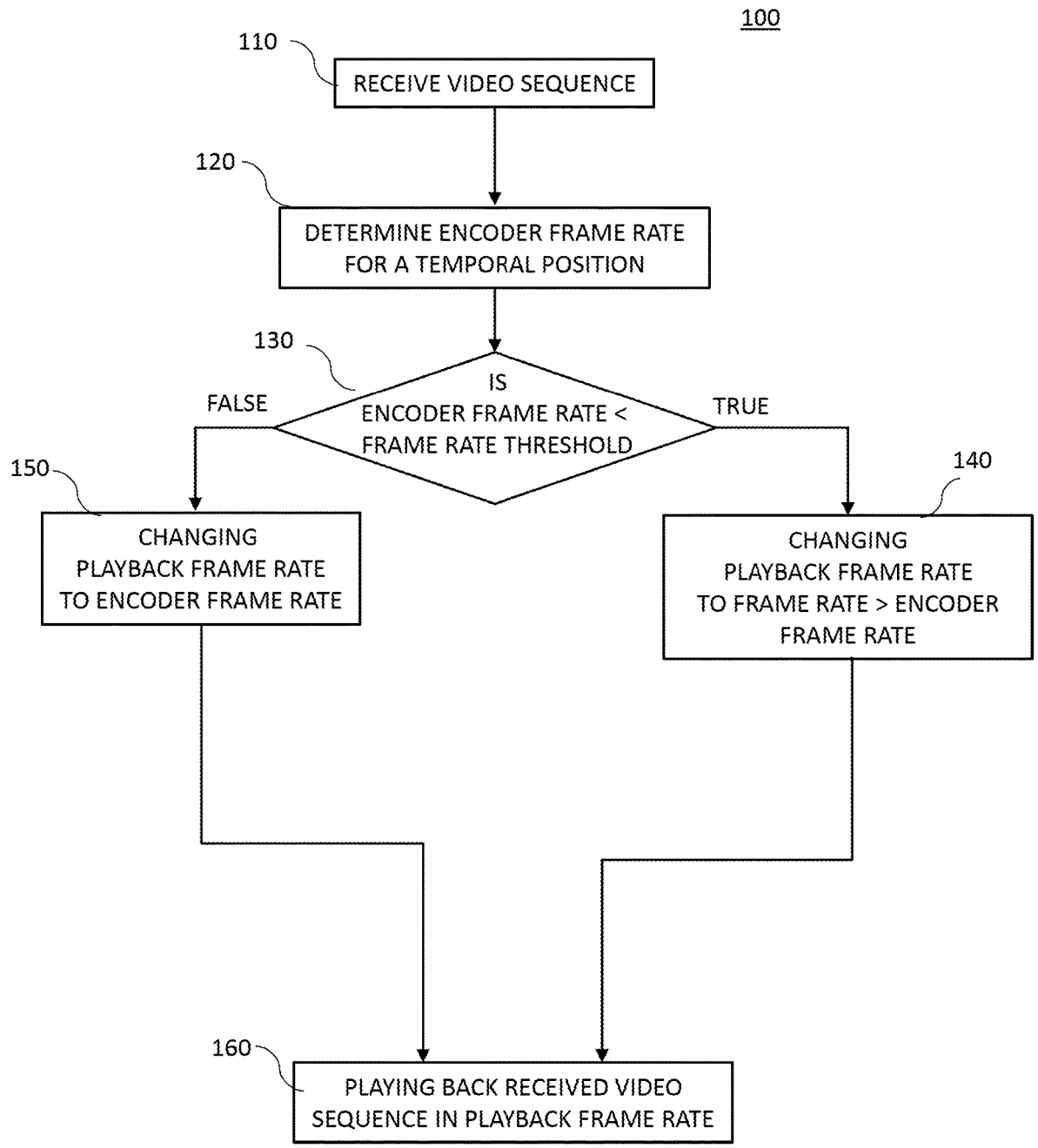
FIG. 1 is a flowchart of a method for playing back recorded video.

Digital video recordings and video streams are represented by sequences of image frames which are captured and played back at a specified frequency. Such frequency is often referred to as frame rate or fps, after "frames per second" which is the unit in which the frame rate is given. When a monitoring camera is recording video from a scene, the monitoring camera may for example be set to encode a video sequence at an encoder frame rate of 15 fps. When playing back this recorded video sequence from the monitoring camera, the play back frame rate may consequently be set to 15 fps for playing back the video sequence at the same pace as it was encoded.

However, when reviewing large amounts of video recordings it may useful to fast forward the playback of the recorded video sequence and in order to e.g. double the pace that the recorded video sequence, in the example above, is played back in the playback frame rate is set to 30 fps, (i.e., multiplying the encoder frame rate by 2). The playback frame rate may in this manner be adapted by multiplying the encoder frame rate with a playback multiplier governing the pace of the playback. By using a playback multiplier between 0 and 1 a playback frame rate corresponding to slow motion playback, playing back the video recording in lower pace than it was recorded, could also be set.

Digital video recordings normally require large amounts of storage space on hard drives and a lot of bandwidth in the networks. This is particularly the case for surveillance video in which a lot of video is recorded during vast time periods. In order to decrease the amount of data needed to represent a digital video recording, plenty of compression schemes have been developed, (e.g., H. 262, H. 264, 11.265, and MPEG). However, decreasing the amount of data used for representing digital video is subject to continuously ongoing research.

One development in the area of digital motion video compression has been to introduce variable frame rate at the encoder, sometimes also called dynamic frame rate. Variable encoder frame rate is to be understood as the encoder frame rate for a digital video being varied during the duration of the recorded video. For example, during a time period with very little movement and/or action in the scene, (e.g., small changes in captured images), the frame rate may be adjusted to a very low value, (e.g., 1 fps), and then when the camera identifies movement and/or action in the scene, (e.g., large or rapid changes in captured images), the frame rate may be adjusted to a value for capturing of the movement, (e.g., 30 fps). Hence, variable encoder frame rate potentially saves a lot of bandwidth and/or storage space. In particular in monitoring or surveillance type scenarios where a lot of recordings do not include any movement at all.

Different video encoders may implement the encoding of the variable encoder frame rate in different ways. In a scenario when the encoder frame rate is decreased the reduction in encoder frame rate may for example be realized by completely dropping video frames from the encoded video stream. Alternatively, instead of dropping video frames completely, these video frames may be encoded as empty frames comprising only the necessary header data and video skip blocks only referring to the same video data as represented in the previous video frame. In order to decrease the time period for playing back a recorded video sequence a method 100 for playing back recorded video by changing the playback frame rate of the video sequence based on the encoder frame rate of the recorded video sequence has been created.

The method is further explained with reference to FIG. 1. A video stream comprising a sequence of video frames with associated time stamps is received at step 110. The video stream may be received from the video encoder encoding the video or from a video storage device such as a network attached storage (NAS) device or a video server. The received video frames of the sequence have associated time stamps denoting a point in time connected to the generation of that particular video frame or image data used in that video frame, it may, for example, be the point in time when the image data was captured by the image sensor, the point in time when the video frame was encoded or the point in time when the video frame was transmitted from the video encoder. Such time stamps may be extracted from the RTP headers or headers of similar network communication protocols. The time stamps may alternatively be extracted from a video header, (e.g., an image frame header), if available.

The encoder frame rate parameters for various positions in the received video stream are determined in step 120. These encoder frame rate parameters may be determined from the time stamps of the received video frames or from encoder frame rate values embedded in the received video stream.

The encoder frame rate parameters may be determined at temporal positions in the received video stream from time stamps of the received video frames by, for example, counting frames for a predetermined time period, including the temporal position in question, or calculating the difference in time between consecutive video frames of which one is connected to the temporal position in question. By counting the number of consecutive received video frames in the video stream within a predetermined time period, including the temporal position in the received video stream, and dividing the counted number of consecutive frames with the predetermined time period the encoder frame rate parameter associated with the temporal position may be determined.

The difference in time between a time stamp of a video frame associated with the temporal position and a time stamp of a preceding, or succeeding, video frame may alternatively be calculated and used for determining the frame rate parameter for the temporal position.

Some video encoders are configured to embed the encoder frame rate in the encoded video stream, it may, for example, be embedded in the frame headers, similar to the time stamps of the video frames, or it may be included as an overlay in the visual part of the video frames as an aid to the person viewing the video. Using any of these alternatives the embedded encoder frame rate may be extracted and determined at various temporal positions in the received video using techniques known to the person skilled in the art.

When determining encoder frame rate parameters for various temporal positions in the received video stream empty video frames may optionally be identified and excluded from the video frames on which the determination of the encoder frame rate is based. In order to identify the empty frames, the video encoding blocks of the received video frames are analyzed to detect video frames solely comprising video encoding blocks of skip block type. By disregarding the identified empty video frames as video frames when determining encoder frame rate parameters, the true variable encoder frame rate will be determined.

When the encoder frame rate parameters have been determined at various temporal positions in the received video stream, the determined encoder frame rates are compared to a predetermined threshold, step 130. The predetermined threshold used in step 130 may be set individually for each monitoring camera or for a group of monitoring cameras to fit the type of scene and video encoders used for encoding the video stream. The predetermined threshold will govern which parts of the video stream which is subject to fast forward playback as the change in playback frame rate depends on the relation of the encoder frame rate at a temporal position to the predetermined threshold. For encoder frame rates that are lesser than the predetermined threshold the playback frame rate will be changed to a frame rate greater than the encoder frame rate at step 140, (e.g., by multiplying the encoder frame rate with a predetermined playback multiplier).

For encoder frame rates that are greater than the predetermined threshold the playback frame rate will be changed to the encoder frame rate at step 150. In FIG. 1, the playback frame rate will be changed to the encoder frame rate in the cases where the encoder frame rates are equal to the predetermined frame rate. In an alternative embodiment, the playback frame rate may be changed to a frame rate greater than the encoder frame rate for these cases. As the cases when the encoder frame rates are equal to the predetermined frame rates belongs to a point in between the two states that are of interest, these cases may be handled either way. It should also be noted that the value to which the predetermined threshold is determined may be adapted for so that these cases are included in either states of the encoder frame rates.

The playback frame rate will typically be set to a default value at the beginning of the video sequence, (e.g., it may be set to the encoder frame rate). Depending on the determined encoder frame rates at various temporal positions in the video sequence it will then be changed according to the method described in FIG. 1. The video sequence is then played back in the changed playback frame rates, at step 160.

It should be noted that the steps of the method 100 may be performed for one video frame at a time, or for a plurality of video frames of a video sequence.

Figure 2A:
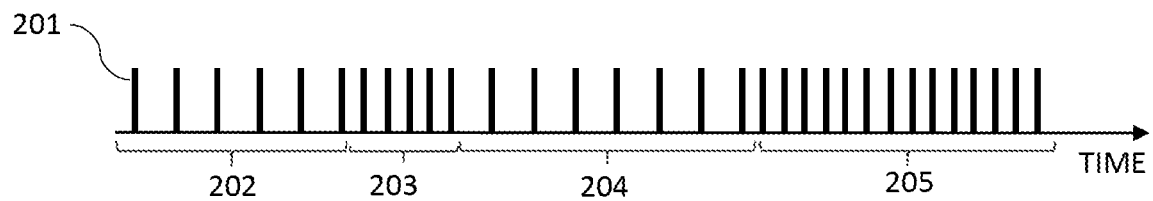
FIGS. 2A, 2B and 2C illustrates an example of a video sequence with variable encoder frame rate and its associated playback frame rate.
Figure 2B:
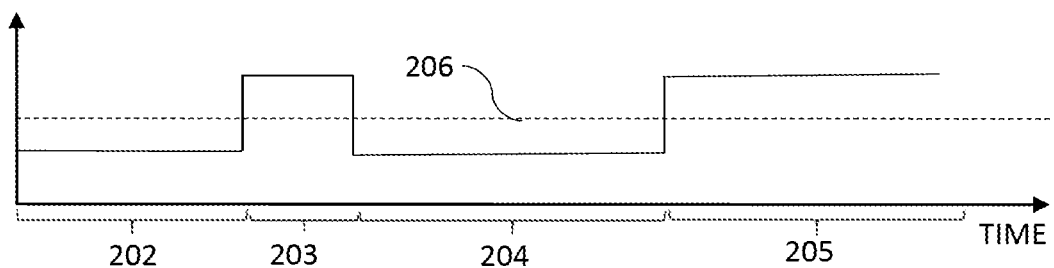
Figure 2C:
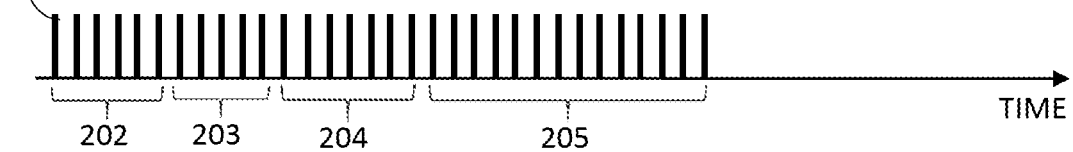

FIGS. 2A, 2B and 2C further illustrate a practical example. FIG. 2A depicts a received video sequence of video frames 201 comprising four parts; 202, 203, 204 and 205. Each part has an associated encoder frame rate which is determined according to methods earlier described, the determined encoder frame rates are illustrated as function of time for the different parts 202-205 in FIG. 2B. As parts 202 and 204 comprises video sequences having encoder frame rates being lesser than the predetermined threshold 206 the playback frame rate of these sequences is changed to playback frame rate greater than the encoder frame rate, in this example the encoder frame rates for these parts are multiplied with a playback multiplier of two, in order to achieve a playback frame rate of twice the encoder frame rate.

The playback frame rate for 203 and 205, which comprises video sequences with encoder frame rates being greater than the predetermined threshold 206, will on the other hand be changed to the encoder frame rate. As the playback frame rate will be greater than the encoder frame rate for 202 and 204 the total time for playing back the received video sequence will be decreased compared to playback in real-time pace, compare FIG. 2A, which illustrates the received video frames of the video sequence in the encoder frame rates, to FIG. 2C, where the received video sequence is illustrated in the playback frame rates. But as this only will be performed for parts of the video sequence when the encoder frame rate is below the predetermined threshold the fast forwarding will only be performed in parts which depicts very little movement and/or action in the scene. The method for playback hence takes advantage of the analysis performed by the encoder which detects the level of activity and determines the encoder frame rate with respect to this. As there may also be parts of a received video sequence which depicts very fast movements and/or a high level of activity, there may also be a need for a method for playing back such a part of the video sequence in slow motion in order for the details of the video content to be graspable for a security operator. An example of such a case may be a video sequence from a monitoring camera monitoring a blackjack or poker table at a casino, where encoder frame rates of up to 60 fps are needed to capture the fast hand movements to detect fraud during the card games.

A threshold for slow-motion playback may then be introduced. The playback frame rate may then be further changed to a frame rate being smaller than the determined encoder frame rate parameter at temporal positions in the received video stream when the determined encoder frame rate parameter is greater than a predetermined threshold for slow-motion playback. The determined encoder frame rate will in that case be multiplied with a predetermined playback multiplier between 0 and 1, as explained above, in order to achieve a playback frame rate for slow motion playback.

The described method for slow-motion playback may be combined with the method for fast forward playback described with reference to FIG. 1 or implemented as a separate method for slow motion playback. A video monitoring system typically comprises more than one video source such as a monitoring camera or a video encoder connected to an analogue monitoring camera. Several monitoring cameras often monitor overlapping scenes, or in other aspects connected scenes, providing video sequences that is contextually linked to other video sequences. An example could be video sequences from monitoring cameras covering the same scene from different views. Monitoring cameras may also provide video footage from the same scene using different video capture and image processing configurations such as colour images, black and white images, with and without infrared filters, with and without high dynamic range processing etc. Monitoring cameras may also be of different types such as cameras capturing visual light, thermal cameras, time-of-flight cameras etc. and thereby providing complementary information about a scene.

In the case of having two or more video sequences that in some respect are connected, the method illustrated in FIG. 1 may be adapted so that all the encoder frame rates of the connected video sequences at a temporal position are compared to the predetermined frame rate threshold in the step 130. This is to make the change of the playback frame rate of a first video sequence dependent on the encoder frame rates of all of the connected video sequences. This will imply that fast forwarding of the first video sequence only is performed if the encoder frame rates of all of the connected video sequences are below the predetermined threshold.

This will be an aid to a person searching for video footage depicting an incident of interest in a video archive as it may be of interest to playback parts of the video sequence in the encoder frame rate if there is concurrent activity or motion in another video sequence which in some respect is connected to the first video sequence. This may aid a security operator searching for video footage of an incident of interest to notice details of interest in the first video sequence that is concurrent with the activity in the other video sequence, but at the same time offer playback in a time efficient manner as the playback frame rate is changed to a fast forward frame rate during time periods when the encoder frame rates of all the video sequences are smaller than the predetermined threshold.

In a video management system, video footage from several video sources may also be viewed concurrently, (e.g., as different viewing windows on a single display unit or on different display units mounted next to each other). When searching for an incident of interest several video sequences recorded concurrently may also be played back concurrently as an aid to the security operator. The methods for playing back recorded video described above may be adapted for synchronizing changes in playback frame rate between a plurality of video sequences which have been captured during at least one overlapping time period and playing back these video sequences. In addition to what has been earlier described for a plurality of connected video sequences and step 130 of FIG. 1, steps 140, 150 and 160 would in these cases be performed for the plurality of video sequences.

If video sequences from several video sources are to be viewed concurrently the time stamps of the video sequences will be used to identify any overlapping time periods. During any non-overlapping time periods of these video sequences the method for playing back a video sequence, described with reference to FIG. 1, may be applied. For the overlapping time periods the playback will need to be synchronized and the method explained with reference to FIG. 1 is adapted, also further explained above.

As earlier has been explained in connection to the method described in FIG. 1 the predetermined threshold will govern which parts of the video stream which are subject to fast forward playback as the change in playback frame rate depends on the relation of the encoder frame rate at a temporal position to the predetermined threshold. For the case when synchronizing the playback of two received video streams a first predetermined threshold may be applied to the received first video stream and a second predetermined threshold may be applied to the received second video stream. Alternatively, the same predetermined threshold may also be applied to both video streams. There may be advantages to having different predetermined thresholds for the video sequences as the threshold then may be individually adapted to fit the type of scene and video encoders used for encoding the video sequences.

Several tiers of predetermined thresholds could also be defined and applied to the same video sequence. In this way different levels of fast forwarding may be implemented depending on the encoder frame rate. As an illustrative example; for very low encoder frame rates, smaller than a predetermined threshold A, the playback multiplier will be high, (e.g., 6 as depicted), for low encoder frame rates, smaller than a predetermined threshold B but greater than the predetermined threshold A, the playback multiplier will be medium high, (e.g., 4), and for somewhat low encoder frame rates, smaller than a predetermined threshold C but greater than the predetermined threshold B, the playback multiplier will be low, (e.g., 2). The advantage of implementing several tiers of predetermined thresholds is that it offers the opportunity to fine-tune the playback frame rate of the video stream, the discrete steps of playback multipliers also implies that the viewing experience of the operator will be more pleasant in contrast to having a continuous relationship between the playback frame rate and the encoder frame rate, which may make the played back video sequence difficult to watch and grasp the details of for the security operator.

Furthermore, the present teachings may take the form of computer program product embodied in one or more a non-transitory computer readable medium(s) having computer readable program code embodied thereon.

Figure 3:
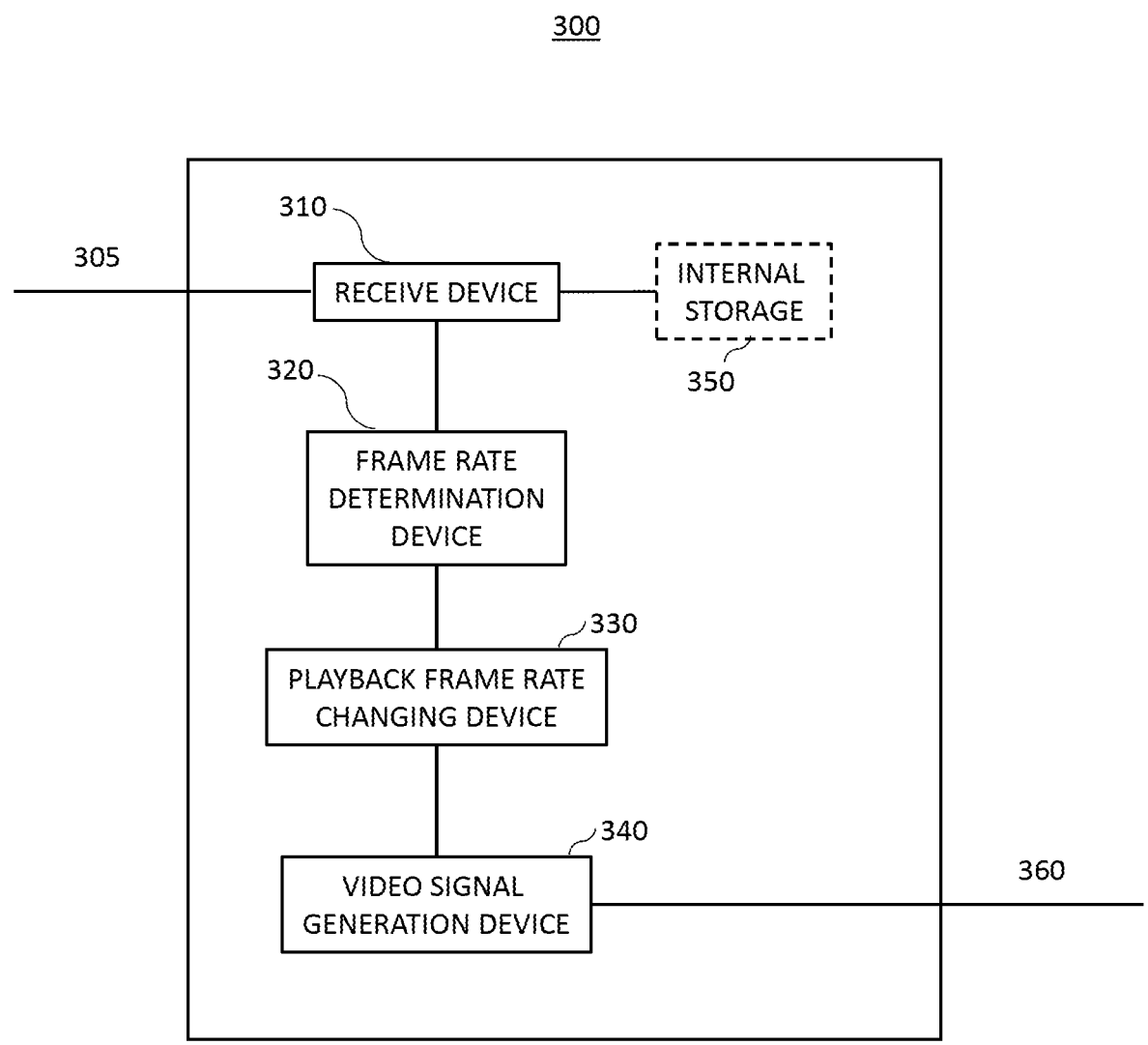
FIG. 3 is a schematic block diagram of a video server for playing back recorded video.

FIG. 3 describes a video server 300 for playing back recorded video. The devise for playing back recorded video is not necessary a video server 30, but may be any device capable of playing back video content, (e.g., a video client, a video management system, a PC, a workstation, a tablet computer, a telephone, and the like). The video server 300 comprises a receiving device 310, a frame rate determining device 320, a playback frame rate changing device 330 and a video signal generating device 340.

The receiving device 310 is arranged to receive at least one video stream comprising a sequence of video frames with associated time stamps. The at least one video stream may, for example, be received from one or more monitoring cameras, from other video servers, or storage devices, such as networked attached storages units (NAS) storing video streams. The video streams may also be received from an internal storage device 350 in the video server, where they have been stored as a part of the video management system.

The frame rate determining device 320 is arranged to determine encoder frame rate parameters for various temporal positions in the at least one received video stream from time stamps of the received video frames or from encoder frame rate values embedded in the received video stream. This may be performed in various manners as previously described in connection to the disclosed method.

The playback frame rate changing device 330 is arranged to change, at temporal positions in the received video stream when the determined encoder frame rate parameter of the received video stream is smaller than a predetermined threshold, a playback frame rate of a received video stream to a frame rate being greater than the determined encoder frame rate parameter, and to change, at temporal positions in the received video stream when the determined frame rate parameter of the received video steam is greater than the predetermined threshold, a playback frame rate being equal to the determined encoder frame rate parameter of the received video stream. This has been described in more detail in connection to the above description of embodiments of the disclosed method.

The video signal generation device 340 is arranged to generate video signals representing the received video stream in the changed playback frame rate. The generated video signals may be further transmitted to a display device, such as a computer monitor, a video projector or a television display. There are various formats and interfaces for transmitting video signals to a display and to mention a few applicable examples VGA, HDMI or PAL may be used when generating video signals representing the received video stream.

Figure 4:
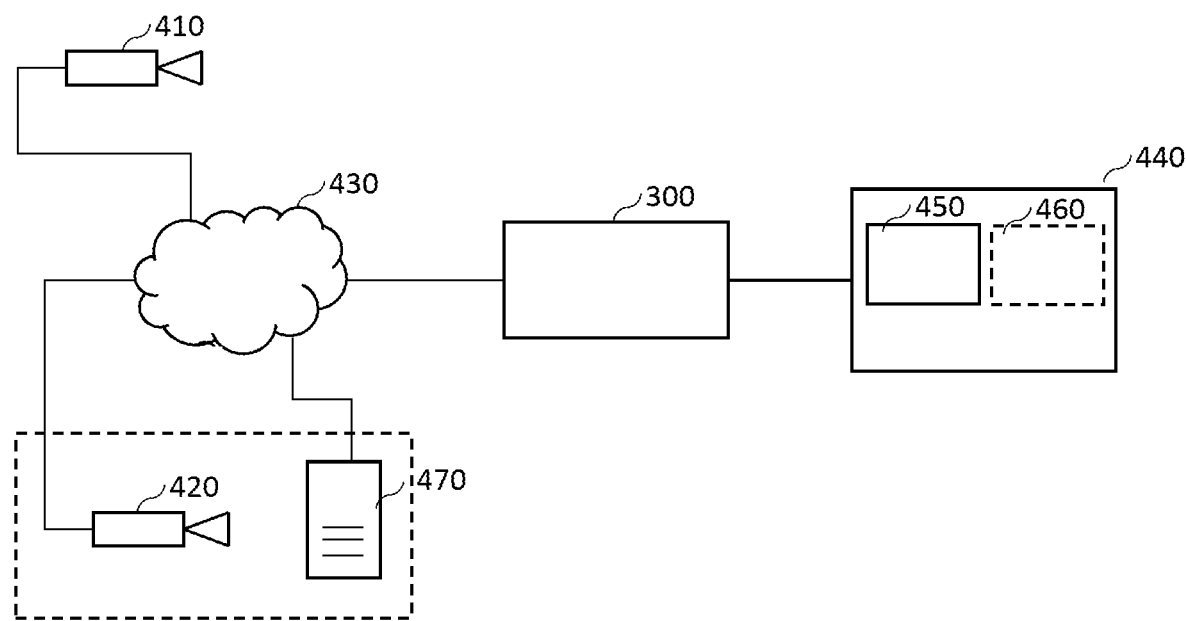
FIG. 4 is a schematic block diagram of a video system for playing back recorded video.

The receiving device 310 of the video server described with reference to FIG. 3 may be adapted to receive a first and a second, at least partially overlapping, video streams comprising sequences of video frames with associated time stamps. The playback frame rate changing device 330 may in this case be further arranged to change, at temporal positions when the determined frame rate parameter of the first video stream and the determined frame rate parameter of the second video stream are both smaller than the predetermined threshold, the playback frame rate of the received first video stream to a frame rate being greater than the determined frame rate parameter of the received first video stream, and to change, at temporal positions when the determined frame rate parameter of the received first video stream or the determined frame rate parameter of the received second video stream is greater than the predetermined threshold, to a frame rate being equal to the determined frame rate parameter of the received first video stream. The video signal generating device 340 may also be further arranged to generate video signals representing the second received video stream in the changed playback frame rate in this case. FIG. 4 describes a system 400 for playing back recorded video. The video system 400 is comprising an image capturing device 410, the previously described video server 300, a communication network 430 and a display device 440. The system 400 for playing back recorded video may also optionally (marked with a box having dashed lines to represent that these devices are optional) comprise a second image capturing device 420 and a video storage device 470.

The image capturing device 410 is arranged to capture image data of a scene, encoding the captured image data as video frames of a video stream and transmitting the video stream. The image capturing devices 410 and 420 may, for example, be a digital network connected monitoring camera or an analogue camera connected to the network via a converter transforming the analogue image information to digital image data. Such a converter might be a video encoder or a video server. What has been earlier described in connection to the above description of embodiments of the disclosed method and video server with respect to monitoring cameras may also be applicable for the image capturing devices 410 and 420. The video storage device 470 may be any type of network attached video storage devices, such as, for example, network attached storages units (NAS). The image capturing device 410, 420 may be equipped to handle storage, processing and management of video data locally or by using a local computational device serving nearby such as video storage device.

The image capturing device 410, 420, the video server 300 and optionally the video storage device 470 connected to the system 400 for playing back recorded video are communicating via a network 430. The network 430 may be any kind of communication network, such as a wire line or wireless data communication network, for example, a local area network (LAN) or a wireless local area network (W-LAN) or a Wide Area Network (WAN).

The display device 440 is arranged to receive and display the video signals generated by the video server 300. Some examples of display devices 440 include computer monitors, video projectors or television displays. As earlier described there are various formats and interfaces for transmitting video signals to a display device and to mention a few applicable examples VGA, HDMI or PAL may be used as an interface between the video server 600 and the display device 440 for transmitting video signals representing the received video stream. The display device 440 may be arranged to display the video stream in a viewing windows 450, and in the case of the system 400 managing a first and a second concurrent video streams a second viewing window 460 for the display of the second video stream may be arranged.

What is claimed is:

1. A method for playing back recorded video, the method comprising:
    receiving a video stream comprising a sequence of video frames with associated time stamps;
    determining encoder frame rate parameters for various temporal positions in the received video stream from time stamps of the received video frames or from encoder frame rate values embedded in the received video stream;
    changing, at temporal positions in the received video stream when the determined encoder frame rate parameter is smaller than a predetermined frame rate threshold, a playback frame rate to a frame rate being greater than the determined encoder frame rate parameter;
    changing, at temporal positions in the received video stream when the determined encoder frame rate parameter is greater than the predetermined frame rate threshold, a playback frame rate to a playback frame rate being equal to the determined encoder frame rate parameter; and
    playing back video frames of the received video stream in the changed playback frame rate.

2. The method according to claim 1, wherein the received video stream is a received first video stream, and the method further comprising:
    receiving a second video stream comprising a second sequence of video frames with associated time stamps, wherein the first and second received video stream have been captured during at least one overlapping time period; and
    determining encoder frame rate parameters for various temporal positions in the received second video stream from time stamps of the received video frames of the second video stream or from encoder frame rate values embedded in the received second video stream;
    wherein the playback frame rate is changed, at temporal positions in the first received video stream when the determined encoder frame rate parameter of the first video stream and the determined frame rate parameter of the second video stream are both smaller than the predetermined frame rate threshold, to a frame rate being greater than the determined frame rate parameter of the received first video stream;
    wherein the playback frame rate is changed, at temporal positions when the determined encoder frame rate parameter of the received first video stream or received second video stream is greater than the predetermined frame rate threshold, to a frame rate being equal to the determined frame rate parameter of the received first video stream.

3. The method according to claim 2, wherein the playback frame rate of the received second video stream is changed, at temporal positions in the second received video stream when the determined frame rate parameter of the first video stream and the determined frame rate parameter of the second video stream are both smaller than the predetermined frame rate threshold, to a frame rate being greater than the determined frame rate parameter of the received second video stream, wherein the playback frame rate of the received second video stream is changed, at temporal positions when the determined encoder frame rate parameter of the received first video stream or received second video stream is greater than the predetermined frame rate threshold, to a frame rate being equal to the determined frame rate parameter of the received second video stream, and the method further comprising playing back video frames of the received second video stream in the changed playback frame rate of the received second video stream.

4. The method according to claim 1, wherein the playback frame rate is further changed to a frame rate being smaller than the determined encoder frame rate parameter at temporal positions in the received video stream when the determined encoder frame rate parameter is greater than a predetermined frame rate threshold for slow-motion playback.

5. The method according to claim 1, wherein the determining encoder frame rate parameters for various temporal positions in the received video stream from time stamps of the received video frames comprises for a temporal position counting the number of consecutive received video frames in a video stream within a predetermined time period including the temporal position in the received video stream and dividing the counted number of consecutive frames with the predetermined time period to determine the encoder frame rate parameters.

6. The method according to claim 1, wherein the determining encoder frame rate parameters for various temporal positions in the received video stream from time stamps of the received video frames comprises for a temporal position calculating the difference in time between a time stamp of video frame at the temporal position and the time stamp of the preceding, or succeeding, video frame and determining the receive frame parameter for the temporal position from the calculated difference in time.

7. The method according to claim 1, wherein the determining encoder frame rate parameters for various temporal positions in the received video stream from encoder frame rate values embedded in the received video stream further comprises extracting the encoder frame rate values embedded in the received video from the headers of the received video stream.

8. The method according to claim 1, wherein the determining encoder frame rate parameters for various temporal positions in the received video stream further comprises:
    analyzing the video encoding blocks of the received video frames to identify empty video frames as video frames solely comprising video encoding blocks of skip block type; and
    disregarding the identified empty video frames as video frames when determining encoder frame rate parameters.

9. The method according to claim 1, wherein the received video stream is encoded with a variable encoder frame rate such that the received video stream is encoded with a first encoder frame rate during a first part of the received video stream and another encoder frame rate during another part of the received video stream.

10. An article of manufacture including a non-transitory computer-readable storage medium having instructions stored thereon for playing back recorded video, execution of which by a computing device causes the computing device to perform operations comprising:
    receiving a video stream comprising a sequence of video frames with associated time stamps;
    determining encoder frame rate parameters for various temporal positions in the received video stream from time stamps of the received video frames or from encoder frame rate values embedded in the received video stream;
    changing, at temporal positions in the received video stream when the determined encoder frame rate parameter is smaller than a predetermined frame rate threshold, a playback frame rate to a frame rate being greater than the determined encoder frame rate parameter;
    changing, at temporal positions in the received video stream when the determined encoder frame rate parameter is greater than the predetermined frame rate threshold, a playback frame rate to a playback frame rate being equal to the determined encoder frame rate parameter; and
    playing back video frames of the received video stream in the changed playback frame rate.

11. A video server for playing back recorded video, comprising;
    a receiving device arranged to receive at least one video stream comprising a sequence of video frames with associated time stamps;
    a frame rate determining device arranged to determine encoder frame rate parameters for various temporal positions in the at least one received video stream from time stamps of the received video frames or from encoder frame rate values embedded in the received video stream;
    a playback frame rate changing device, arranged to change, at temporal positions in the received video stream when the determined encoder frame rate parameter of the received video stream is smaller than a predetermined frame rate threshold, a playback frame rate of a received video stream to a frame rate being greater than the determined encoder frame rate parameter, and to change, at temporal positions in the received video stream when the determined frame rate parameter of the received video steam is greater than the predetermined frame rate threshold, a playback frame rate being equal to the determined encoder frame rate parameter of the received video stream; and
    a video signal generating device arranged to generate video signals representing the received video stream in the changed playback frame rate.

12. The video server according to claim 11, wherein the receiving device is arranged to receive a first and a second video stream comprising sequences of video frames with associated time stamps, wherein the first and second received video streams have been captured during at least one overlapping time period, the playback frame rate changing device is arranged to change, at temporal positions when the determined frame rate parameter of the first video stream and the determined frame rate parameter of the second video stream are both smaller than the predetermined frame rate threshold, the playback frame rate of the received first video stream to a frame rate being greater than the determined frame rate parameter of the received first video stream, and to change, at temporal positions when the determined frame rate parameter of the received first video stream or the determined frame rate parameter of the received second video stream is greater than the predetermined frame rate threshold, to a frame rate being equal to the determined frame rate parameter of the received first video stream, and the video signal generating device is arranged to generate video signals representing the second received video stream in the changed playback frame rate.

13. A system for playing back recorded video comprising;
    an image capturing device, arranged to capture image data of a scene, encoding the captured image data as video frames of a video stream and transmitting the video stream;
    a video server arranged to receive the transmitted video stream from the monitoring camera; and
    a display device arranged to receive and display the video signals generated by the video server;
    wherein the video server comprises a receiving device arranged to receive at least one video stream comprising a sequence of video frames with associated time stamps, a frame rate determining device arranged to determine encoder frame rate parameters for various temporal positions in the at least one received video stream from time stamps of the received video frames or from encoder frame rate values embedded in the received video stream, a playback frame rate changing device, arranged to change, at temporal positions in the received video stream when the determined encoder frame rate parameter of the received video stream is smaller than a predetermined frame rate threshold, a playback frame rate of a received video stream to a frame rate being greater than the determined encoder frame rate parameter, and to change, at temporal positions in the received video stream when the determined frame rate parameter of the received video steam is greater than the predetermined frame rate threshold, a playback frame rate being equal to the determined encoder frame rate parameter of the received video stream, and a video signal generating device arranged to generate video signals representing the received video stream in the changed playback frame rate.

14. A system for playing back recorded video comprising;
a first image capturing device, arranged to capture image data of a scene, encoding the captured image data as video frames of a first video stream and transmitting the first video stream;
a second image capturing device arranged to capture image data of a scene, encoding the captured image data as video frames of a second video stream and transmitting the second video stream, wherein the first and second video streams are captured during at least one overlapping time period;
a video server; and
a display device arranged to receive and display the video signals generated by the video server representing the received first video stream and received second video stream, wherein the received first video stream and received second video stream are displayed concurrently during the at least one overlapping time period by the display device;
wherein the video server comprises a receiving device arranged to receive at least one video stream comprising a sequence of video frames with associated time stamps, a frame rate determining device arranged to determine encoder frame rate parameters for various temporal positions in the at least one received video stream from time stamps of the received video frames or from encoder frame rate values embedded in the received video stream, a playback frame rate changing device, arranged to change, at temporal positions in the received video stream when the determined encoder frame rate parameter of the received video stream is smaller than a predetermined frame rate threshold, a playback frame rate of a received video stream to a frame rate being greater than the determined encoder frame rate parameter, and to change, at temporal positions in the received video stream when the determined frame rate parameter of the received video steam is greater than the predetermined frame rate threshold, a playback frame rate being equal to the determined encoder frame rate parameter of the received video stream, and a video signal generating device arranged to generate video signals representing the received video stream in the changed playback frame rate;
wherein the receiving device is arranged to receive a first and a second video stream comprising sequences of video frames with associated time stamps, wherein the first and second received video streams have been captured during at least one overlapping time period, the playback frame rate changing device is arranged to change, at temporal positions when the determined frame rate parameter of the first video stream and the determined frame rate parameter of the second video stream are both smaller than the predetermined frame rate threshold, the playback frame rate of the received first video stream to a frame rate being greater than the determined frame rate parameter of the received first video stream, and to change, at temporal positions when the determined frame rate parameter of the received first video stream or the determined frame rate parameter of the received second video stream is greater than the predetermined frame rate threshold, to a frame rate being equal to the determined frame rate parameter of the received first video stream, and the video signal generating device is arranged to generate video signals representing the second received video stream in the changed playback frame rate.

* * * * *